F. TRINKS.
CALCULATING MACHINE.
APPLICATION FILED SEPT. 23, 1915.
1,220,029. Patented Mar. 20, 1917.
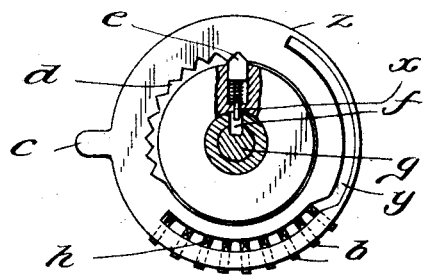
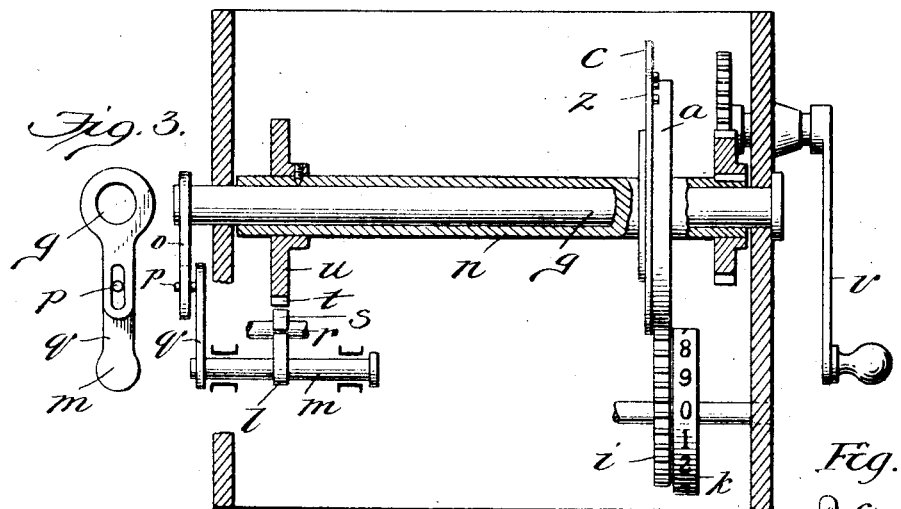
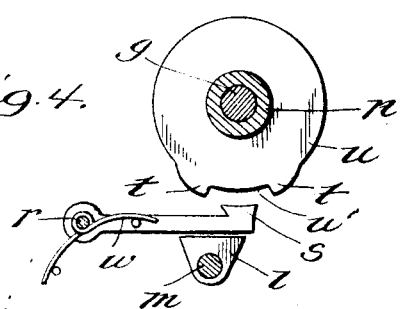
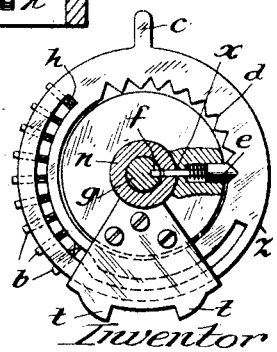
Inventor
Franz Trinks
by James L. Norris,
Attorney
Witnesses:
C. Wesler
C. A. Rowe

UNITED STATES PATENT OFFICE.

FRANZ TRINKS, OF BRUNSWICK, GERMANY.

CALCULATING-MACHINE.

1,220,029. Specification of Letters Patent. Patented Mar. 20, 1917.

Application filed September 23, 1915. Serial No. 52,312.

*To all whom it may concern:*

Be it known that I, FRANZ TRINKS, manufacturer, citizen of the Duchy of Brunswick, Empire of Germany, residing at Brunswick, Germany, have invented certain new and useful Improvements in Calculating-Machines, of which the following is a specification.

My invention relates to calculating machines and more especially to machines of that type wherein shiftable teeth are carried by calculating wheels mounted on a crank shaft and wherein manually operated setting rings serve, when actuated, to project the necessary number of teeth of the calculating wheels with which they are respectively associated in order, when said crank shaft is actuated, to rotate registering-drums to the numbers to be indicated.

The object of my invention is to provide means for locking the crank shaft against movement where any of the setting rings has not assumed its exact position, and thus prevent a wrong number of teeth from being projected from the calculating wheel and a false calculating operation from being carried out.

Referring to the accompanying drawings, wherein the preferred embodiment of my invention is represented—

Figure 1 is an elevation, partly in section of a calculating wheel, set-ring, crank shaft and the device for coupling same with a concentric shaft;

Fig. 2 is a longitudinal section of part of a calculating machine showing the locking device, one of the calculating wheels and its set-ring being shown in elevation;

Fig. 3 is a detail;

Fig. 4 is a side view of the locking device.

Fig. 5 is a view similar to Fig. 1 and showing a modification.

$n$ is the hollow crank shaft, $v$ is the crank handle in gear with it, and $a$ is one of a plurality of calculating wheels fixed on said hollow shaft. $b$, $b$ are loose teeth arranged on said wheel and provided with projections $h$ fitting into a common segmental groove $y$ of a set-ring $z$ mounted on said wheel. The segmental groove $y$ is composed of two parts of approximately equal length, one part being nearer the center of the ring than the other part. The ring $z$ is provided with a handle $c$ which projects through a slot in the casing surrounding the machine whereby the ring may be set by hand. The ring is provided on its interior with a row of notches $d$ and a spring-actuated pawl $e$ arranged within a radial bore in the calculating wheel $a$ opposite said notches will enter any one of said notches and thus cause the ring $z$ to assume an exact position.

The calculating wheel, when the crank shaft $n$ is rotated also rotates a registering drum $k$ according to the number of teeth which project from the calculating wheel and which engage teeth on a wheel $i$ formed as a part of or secured to said drum.

Now it may happen that the set-ring $z$, after having been turned by hand, does not assume a position to project the loose teeth $b$ far enough to engage the teeth of the wheel $i$ with which they are in gear, the pawl $e$ being thus prevented from entering one of the notches $d$ on ring $z$. In order to avoid a false calculating operation which would necessarily result from such inaccuracy of position, it has been proposed to lock the crank shaft against rotation whenever such inaccuracy occurs. This has been effected by providing a pin $x$ at the rear end of pawl $e$ and a corresponding perforation $f$ in the hollow crank shaft $n$ and in a fixed bar carrying said shaft, the pawl $e$ on leaving one of the notches $d$ forcing the pin $x$ into said perforations and thus locking the shaft, until the pawl has entered another notch of the set ring $z$, thus withdrawing the locking pin from the shaft and bar. When the pawl $e$ is in a position between two notches the shaft $n$ is locked against rotation and no calculating operation can be carried out.

However, such a locking device as that described has the disadvantage that the relatively weak locking pin is subjected to all of the stress exerted upon the crank handle when it is attempted to turn the shaft while in locked position. In order to relieve the pin of this stress and to prevent it from being broken, I replace the fixed bar which carries the hollow crank shaft by a rock shaft $g$ adapted to be rocked by the hollow crank shaft whenever said shafts are coupled by means of pin $x$. A ratchet disk $u$, provided with teeth $t$ to form a notch $u'$ is fixed on the hollow shaft. The inner or rock shaft $g$ is provided at one end with a slotted crank arm o, and a short counter shaft m parallel to shaft g carries another crank arm q provided with a pin p which projects into the slot of crank arm o. A double acting cam l is fixed to counter shaft m below ratchet disk u, and a double acting pawl s pivoted to a pin r is pressed down upon the upper face of said cam by a spring w.

The operation of this locking device is as follows: In the case mentioned above, where the set-ring z after having been turned has not assumed an exact position, the pawl e being thus prevented from entering one of the notches d, the lock pin x is held back in the perforations f of shafts n and g, thus coupling both shafts and causing hollow shaft n, when the handle v is actuated, to rotate along with it. This movement causes crank arm o of the shaft g to oscillate crank arm q and counter shaft m carrying the latter. The cam l on shaft m will now lift pawl s, against the action of spring w, into notch u' of lock disk u, thus locking the crank shaft v against further movement until the coupling between it and shaft g has been released by bringing disk z into a position where pawl e can enter one of the notches d, to withdraw the coupling pin x from the depression in shaft g which is then caused to return to its initial position by means of the spring w acting upon the pawl s acting through it upon the cam l, shaft m and crank arms q and o.

It is to be understood that I do not limit myself to the exact form of coupling, locking and driving elements described above but I reserve the right to make such changes and variations in the construction as properly fall within the scope of the appended claims. Thus the teeth t instead of being arranged on a separate ratchet disk might form part of one of the wheels a fixed on shaft n, as shown in Fig. 5.

I claim:—

1. In a calculating machine, a pair of concentric shafts; shiftable number-operating means carried by one of said shafts; means for shifting said number operating means into and out of operative position; means carried by one of said shafts for arresting said shifting means in set position and adapted, when said shifting means is not in proper position, to couple said shafts; and means operable by one of said shafts when said shafts are coupled and given an initial movement to lock the other shaft against rotation.

2. In a calculating machine, a pair of concentric shafts; shiftable number-operating means carried by one of said shafts; means for shifting said number operating means into and out of operative position; a detent carried by one of said shafts to arrest said shifting means in set position and serving, when said shifting means is not in an arrested position, to couple said concentric shafts; and means associated with one of said shafts and operative, when said shafts are coupled and initially rocked to lock the other shaft against rotation.

3. In a calculating machine, a rotatable shaft and a rock-shaft arranged in concentric relation; shiftable number-operating means carried by the rotatable shaft; means associated with said number-operating means to shift the latter into and out of operative position; means actuated by said shifting means for coupling said shafts whenever said shifting means has assumed an intermediate position; a pawl adapted to engage and lock said rotatable shaft against movement; and means associated with said rock shaft for moving said pawl into engagement with said rotatable shaft when said shafts are coupled and said shafts are initially rocked.

4. In a calculating machine, a pair of concentric shafts; shiftable number-operating means carried by the outer shaft; means for shifting said number operating means into and out of operative position; means actuated by said shifting means for coupling said shafts whenever said shifting means has assumed an intermediate position; a pawl movable into and out of engagement with said outer shaft; a cam associated with said pawl; and means associated with the inner shaft for actuating said cam and moving said pawl into engagement with the outer shaft whenever the shafts are coupled and the outer shaft is initially rocked.

5. In a calculating machine, a pair of concentric shafts; shiftable number-operating means carried by one of said shafts; means for shifting said number-operating means into and out of operative position; a spring actuated pawl carried by said shaft adapted to engage and arrest said number-shifting means in set position and adapted to engage the other shaft whenever said pawl is not in arresting position; and means operable by said latter shaft for locking said first-named shaft against rotation when said shafts are coupled and initially rocked.

6. In a calculating machine, a rotatable shaft and a rock-shaft mounted in concentric relation; shiftable number-operating means carried by said rotatable shaft; set rings associated with said rotatable shaft for shifting said number-operating means, each having notches on its inner face; a spring actuated pawl carried by said rotatable shaft adapted to enter said notches and adapted to engage said rock shaft to couple said shafts whenever said pawl has not entered one of said notches; a pawl movable into engagement with said rotatable shaft to lock same against rotation; a cam for actuating said pawl; and means associated with the rock shaft for actuating the cam and thereby moving said pawl into engagement with said rotatable shaft when said shafts are coupled and the rotatable shaft is given an initial movement.

In testimony whereof I have hereunto set my hand in presence of two subscribing witnesses.

FRANZ TRINKS.

Witnesses:
RICHARD KÜLBS,
EUGENE C. HARTER.